(12) United States Patent
Son

(10) Patent No.: US 7,055,385 B2
(45) Date of Patent: Jun. 6, 2006

(54) APPARATUS AND METHOD FOR MEASURING THE AMOUNT OF FUEL IN A VEHICLE USING TRANSMISSION LINES

(75) Inventor: Taeho Son, CheonAn-shi (KR)

(73) Assignee: Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 10/730,063

(22) Filed: Dec. 9, 2003

(65) Prior Publication Data

US 2004/0112127 A1   Jun. 17, 2004

(30) Foreign Application Priority Data

Dec. 9, 2002   (KR) ...................... 10-2002-0077878

(51) Int. Cl.
*G01F 23/00* (2006.01)

(52) U.S. Cl. .................................. 73/290 R; 73/304 C

(58) Field of Classification Search ............. 73/290 R, 73/291, 304 R, 304 C, 118.1, 1.73
See application file for complete search history.

(56) References Cited

U.S. PATENT DOCUMENTS

| | | | | |
|---|---|---|---|---|
| 3,010,318 A | * | 11/1961 | Mongan | 73/290 V |
| 4,472,968 A | | 9/1984 | Coates | |
| 5,050,433 A | * | 9/1991 | Lumetta | 73/313 |
| 5,531,111 A | * | 7/1996 | Okamoto et al. | 73/149 |
| 5,602,333 A | * | 2/1997 | Larrabee et al. | 73/149 |
| 5,602,540 A | * | 2/1997 | Spillman, Jr. | 340/870.37 |
| 5,627,380 A | * | 5/1997 | Crowne | 250/577 |
| 5,747,689 A | * | 5/1998 | Hampo et al. | 73/304 C |
| 6,418,787 B1 | * | 7/2002 | Eck | 73/290 V |
| 6,598,473 B1 | * | 7/2003 | Atkinson | 73/290 V |
| 6,777,956 B1 | * | 8/2004 | Davis | 324/658 |
| 2001/0010171 A1 | * | 8/2001 | Atkinson | 73/290 V |
| 2004/0005496 A1 | * | 1/2004 | Kelley et al. | 429/91 |
| 2004/0079150 A1 | * | 4/2004 | Breed et al. | 73/291 |
| 2004/0085200 A1 | * | 5/2004 | McConnel et al. | 340/450.2 |
| 2004/0199131 A1 | * | 10/2004 | Kitamura | 604/318 |

FOREIGN PATENT DOCUMENTS

| | | |
|---|---|---|
| JP | 03-197824 | 8/1991 |
| JP | 11-030544 | 2/1999 |

* cited by examiner

*Primary Examiner*—Eric S. McCall
(74) *Attorney, Agent, or Firm*—Roylance, Abrams, Berdo & Goodman, L.L.P.

(57) ABSTRACT

The present invention relates to an apparatus and method for measuring the amount of fuel in a vehicle using transmission lines. An apparatus for measuring the amount of fuel in a vehicle according to an embodiment of the invention comprises a pair of transmission lines provided within a fuel tank, a measuring unit for measuring reflective wave or capacitance voltage which varies in accordance with the depth of the fuel by generating high-frequency wave in the transmission line.

4 Claims, 5 Drawing Sheets

APPARATUS AND METHOD FOR MEASURING THE AMOUNT OF FUEL IN A VEHICLE USING TRANSMISSION LINES

FIELD OF THE INVENTION

The present invention relates to an apparatus and method for measuring the amount of fuel in a vehicle using transmission line. Specifically, the invention is directed to a novel electronic fuel gauge and method which does not require a varying resistor and the like.

BACKGROUND OF THE INVENTION

It is very dangerous to install electronic devices such as an electronic sensor or lamp in a fuel gauge since the gauge measures the amount of gasoline which is a very explosive material.

A conventional fuel gauge is provided with a floating body containing air. The location of the floating body varies in accordance with the amount of fuel contained in a fuel tank. The variation induces resistance variation in a resistor which is provided at the end of the floating body, thereby indicating the fuel amount contained in the fuel tank.

However, the prior art has the following problems.

First, some contaminants affect the buoyancy of the floating body, thereby causing error or malfunction of the gauge.

Second, the varying resistor whose resistance varies in accordance with the floating location of the floating body has a problem of frequent error or malfunction due to corrosion of contact points of the resistor.

Therefore, of interest is a new gauge which does not need the floating body and the varying resistor. Further, it has been desired to provide an apparatus for measuring fuel amount, which does not comprise electronic devices such as an electronic sensor, lamp and the like since the material to be measured is a fuel such as gasoline that is very explosive.

SUMMARY OF THE INVENTION

The object of the present invention is to provide an electronic fuel gauge and method that does not need a floating body and a varying resistor and that does not comprise electronic devices such as a sensor, a lamp and the like, thereby preventing the gauge from causing error or malfunction due to corrosion and/or mechanical disorder.

Another object of the invention is to provide a fuel gauge and method that does not directly comprise electronic devices such as a sensor, lamp and the like, thereby making it possible to safely provide the gauge in a fuel tank containing gasoline which is a very explosive material.

An apparatus for measuring fuel amount of vehicle according to one embodiment of the invention comprises a pair of transmission lines provided within a fuel tank, and a measuring unit for measuring a reflective wave or capacitance voltage which varies in accordance with the depth of the fuel by generating a high-frequency wave in the transmission line.

The measuring unit may comprise a housing and a circuit substrate including a measuring circuit. The circuit substrate is provided within the housing. The apparatus may further comprise a sealing member in a connecting portion between the transmission lines and the measuring unit.

The measuring circuit preferably comprises a high-frequency generating module for generating a signal applied to the transmission lines; and a reflective wave detecting module for detecting a reflective signal and calculating a reflective coefficient by comparing the reflective signal with the signal generated by the high-frequency generating module. The reflective wave detecting module can thereby measure the depth of the fuel based on the reflective coefficient. Alternately, a capacitance detecting module for detecting capacitance voltage can be used to calculate the depth of the fuel from the capacitance voltage. The device also preferably comprises an amplifier for amplifying the output signal from the reflective wave detecting module or the capacitance voltage detecting module; and a connector for transmitting the amplified signal to an instrument panel of the vehicle.

A load resistor may be provided at the ends of the transmission lines. The transmission lines are preferably provided within a pipe member made of nonconductor. The pipe member has an open end so that fuel can flow therein.

It is preferred that the transmission lines and the load resistor are sealed with a nonconductor.

It is also preferred that the transmission lines are selected from a group of high-frequency transmission lines consisting of a pair of transmission lines, a strip a coplanar waveguide, a coplanar strip, and a coaxial cable.

A method for measuring fuel contained in a fuel tank of a vehicle includes supplying a high-frequency wave to transmission lines provided within the fuel tank. The method also includes measuring an amplitude of a reflective wave or capacitance voltage in the transmission lines where the amplitude varies with the depth of fuel in the tank.

In a preferred method according to an embodiment of the invention, a detector detects the reflective wave or capacitance voltage. The reflective wave or capacitance voltage is preferably amplified and transmitted to an instrument panel of the vehicle.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating preferred embodiments of the invention and are not to be construed as limiting the invention. In the drawings.

In the drawings, it will be understood that like reference numerals refer to like features or structures.

DETAILED DESCRIPTION OF THE INVENTION

Figure 1:
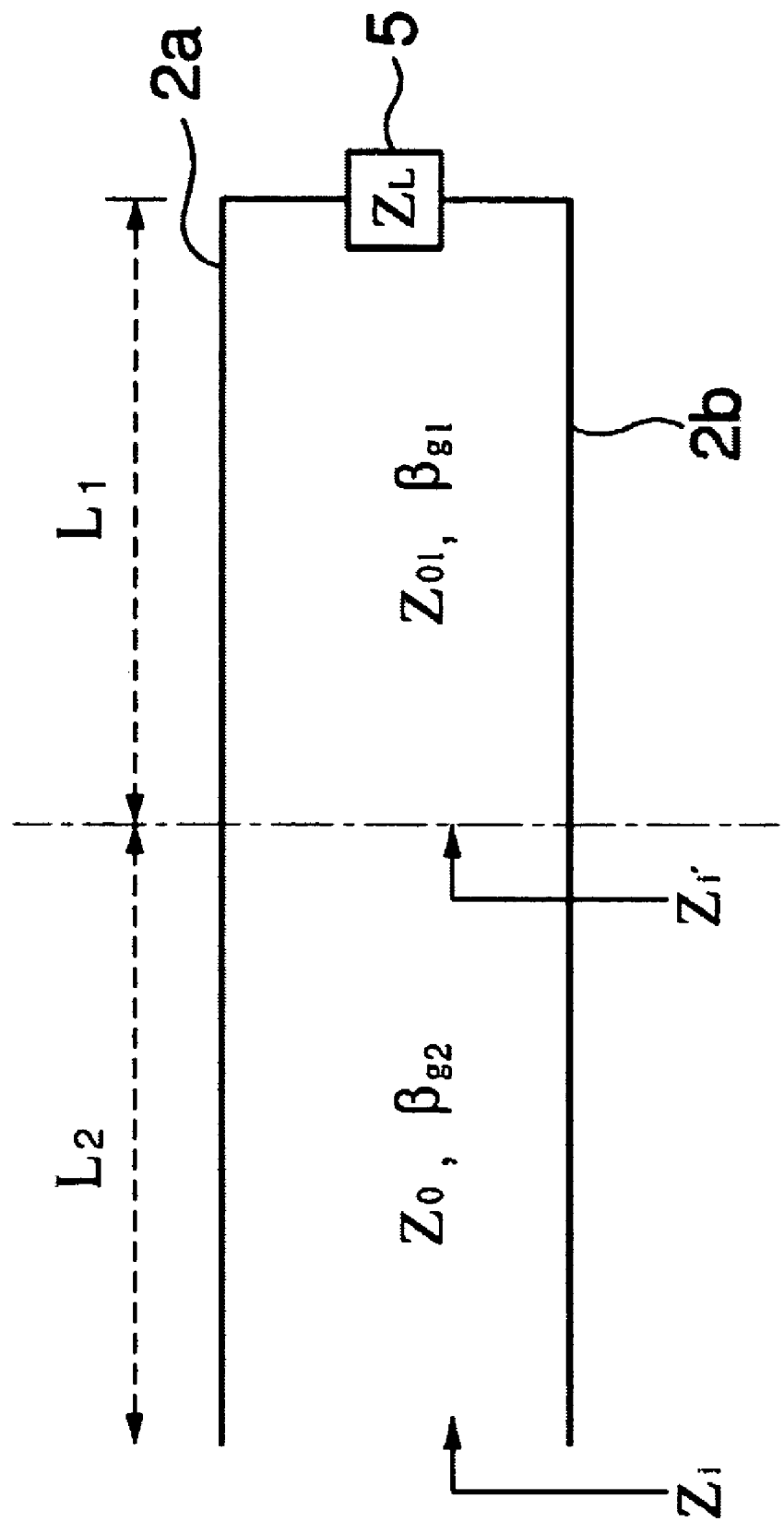
FIG. 1 shows a circuit diagram of a pair of transmission lines according to an embodiment of the invention.
Figure 2:
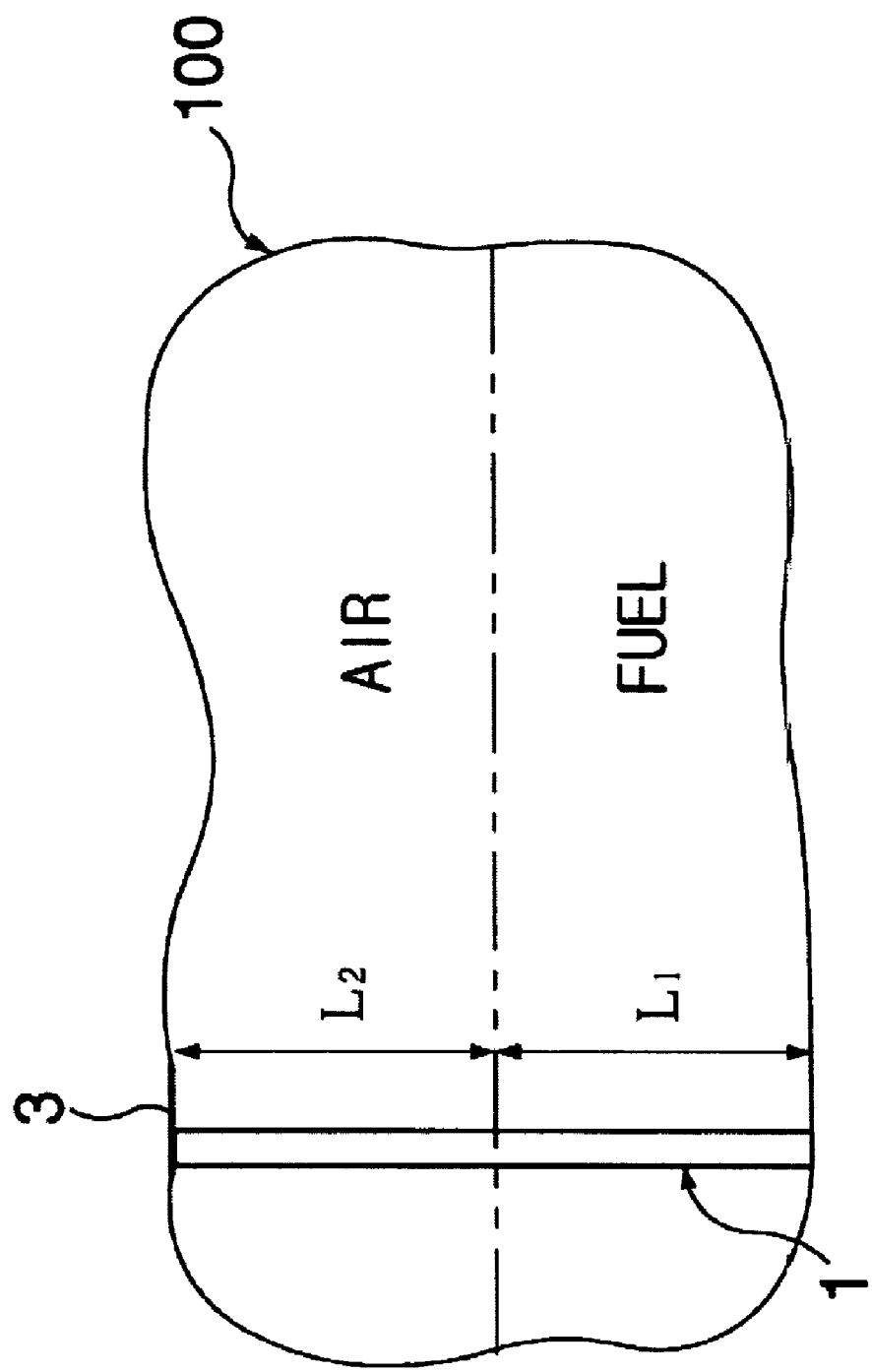
FIG. 2 shows a schematic construction of an embodiment of the fuel gauge using the pair of transmission lines according to an embodiment of the invention.
Figure 3:
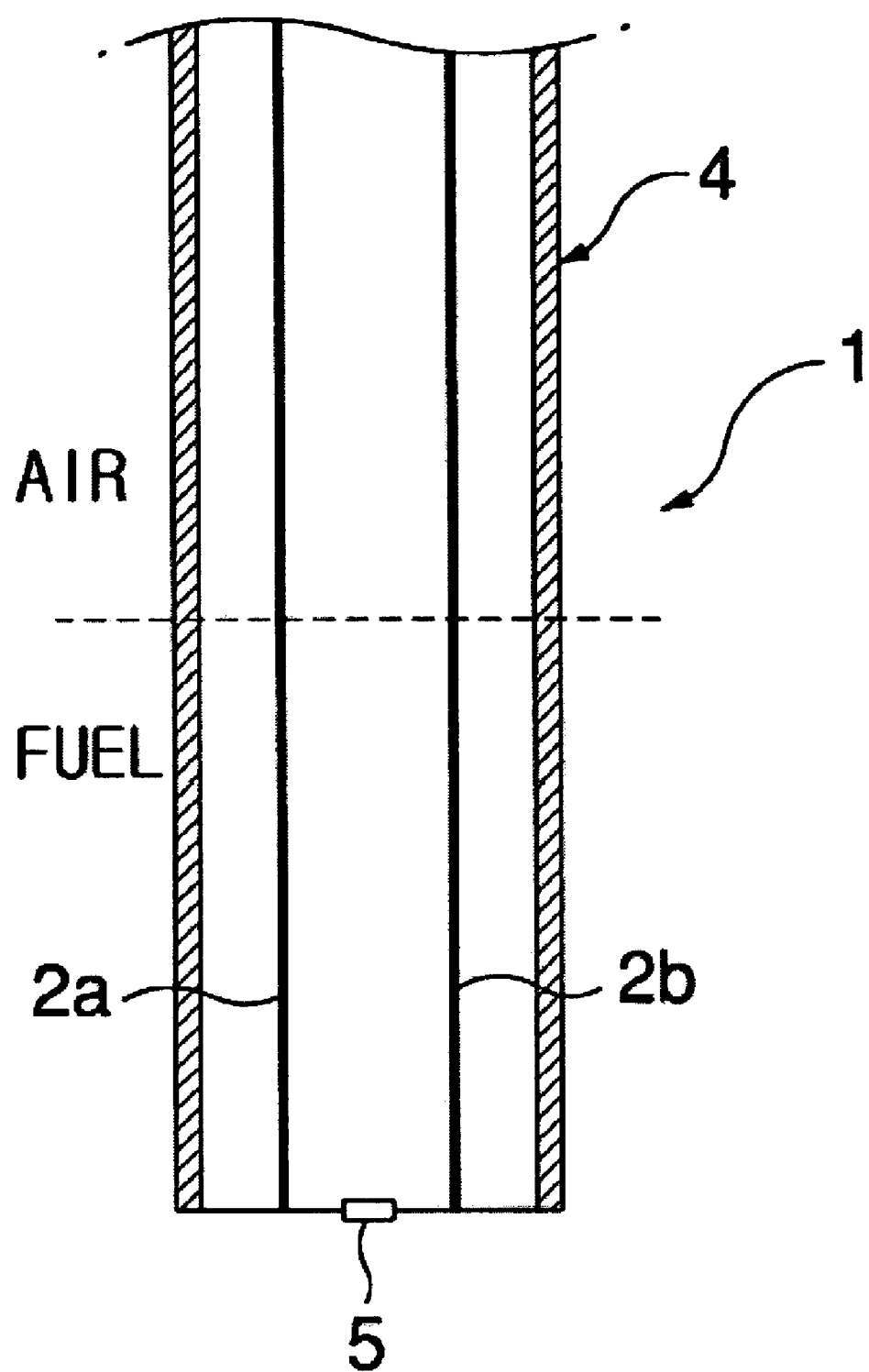
FIG. 3 shows a portion of the fuel gauge comprising the pair of transmission lines in detail according to an embodiment of the invention.

FIG. 1 is a circuit diagram illustrating the principle of the fuel gauge of embodiments of the present invention. FIG. 2 shows a concept of an apparatus for measuring fuel amount, which comprises a pair of transmission lines. A fuel tank 100 is shown being provided with the apparatus 1. FIG. 3 shows a portion of the fuel gauge 1 comprising the pair of transmission lines 2a, 2b.

In the circuit comprising the pair of transmission lines 2a, 2b, capacitance and characteristic impedance vary in accordance with the depth of fuel existing between the lines, thereby causing variation of the reflective coefficient. Thus, it will be understood that the fuel amount is measured by measuring the reflective wave or capacitance voltage in the pair of transmission lines 2a, 2b. The measured value is preferably amplified to be indicated in the instrument panel.

The principle of measuring fuel amount using the reflective wave in the pair of transmission lines 2a, 2b will now be described in detail.

As shown in FIG. 1, a load resistor $Z_L$ is provided at the ends of the pair of transmission lines 2a, 2b. The characteristic impedance when fuel exists between the transmission lines 2a, 2b is set as $Z_{01}$.

The characteristic impedance of the lines is determined by the relative dielectric constant of the material between lines 2a, 2b, the thickness of lines 2a, 2b and the distance between the lines 2a, 2b. The impedance $Z_{i'}$ in the surface of the fuel is calculated by the following formula:

$$Z_{i'} = Z_{01} \frac{Z_L + jZ_{01}\tan(\beta_{g1}L_1)}{Z_{01} + jZ_L\tan(\beta_{g1}L_1)}$$

where $L_1$ is depth of fuel and $\beta_{g1}$ is the transmission constant of transmission lines 2a, 2b in the area of the fuel.

The input impedance $Z_i$ outside of the fuel tank is calculated by the following formula:

$$Z_i = Z_0 \frac{Z_{i'} + jZ_0\tan(\beta_{g2}L_2)}{Z_0 + jZ_{i'}\tan(\beta_{g2}L_2)}$$

where $L_2$ is the distance between the fuel surface and fuel tank and $\beta_{g2}$ is the transmission constant of the transmission lines in the area between the fuel surface and the fuel tank.

The reflective coefficient $\rho$ is calculated by the following formula.

$$\rho = \frac{Z_{i'} - Z_0}{Z_{i'} + Z_0}$$

Therefore, it is understood that the amplitude of the reflective wave varies in accordance with the depth of the fuel contained in fuel tank 100. That is, the amount of fuel can be determined by measuring the amplitude of the reflective wave.

According to these principles, measurement of the reflective wave reveals the depth of the fuel $L_1$ since the reflective coefficient varies depending upon the depth of the fuel. As the fuel enters between transmission lines 2a, 2b, the characteristic impedance changes and the impedance in the surface of the fuel also changes in the construction wherein an open or load resistor is provided at the ends of the transmission lines 2a, 2b.

Furthermore, capacitance C between the lines 2a, 2b is calculated by the following formula.

$$C = C_1 + C_2$$

Where $C_1$ is capacitance in the area where fuel exists and $C_2$ is capacitance in the area where fuel does not exist.

Therefore, the capacitance between the lines 2a, 2b depends upon the amount of fuel contained in fuel tank 100. When a high-frequency wave is applied at the ends of lines 2a, 2b, a voltage is induced that varies in accordance with the capacitance. Thus, the amount of fuel can be measured by measuring the induced voltage.

Embodiments of the invention will now be described in further detail with reference to FIGS. 2 and 3.

An apparatus 1 for measuring fuel amount is provided within fuel tank 100 and is provided with measuring unit 3 for supplying a high-frequency wave and measuring reflective waves at the end thereof. As shown in more detail in FIG. 3, transmission lines 2a, 2b are provided within pipe member 4 made of a nonconductor such as plastic or glass. The lower end of the pipe member is open. With this structure, it is possible to prevent sudden changes of fuel depth due to vehicle movement since the fuel exists between lines 2a, 2b.

The ends of lines 2a, 2b are provided with a resistor 5, such as a chip load resistor. It is preferred that transmission lines 2a, 2b and load resistor 5 are completely sealed with urethane or vinyl.

Figure 4:
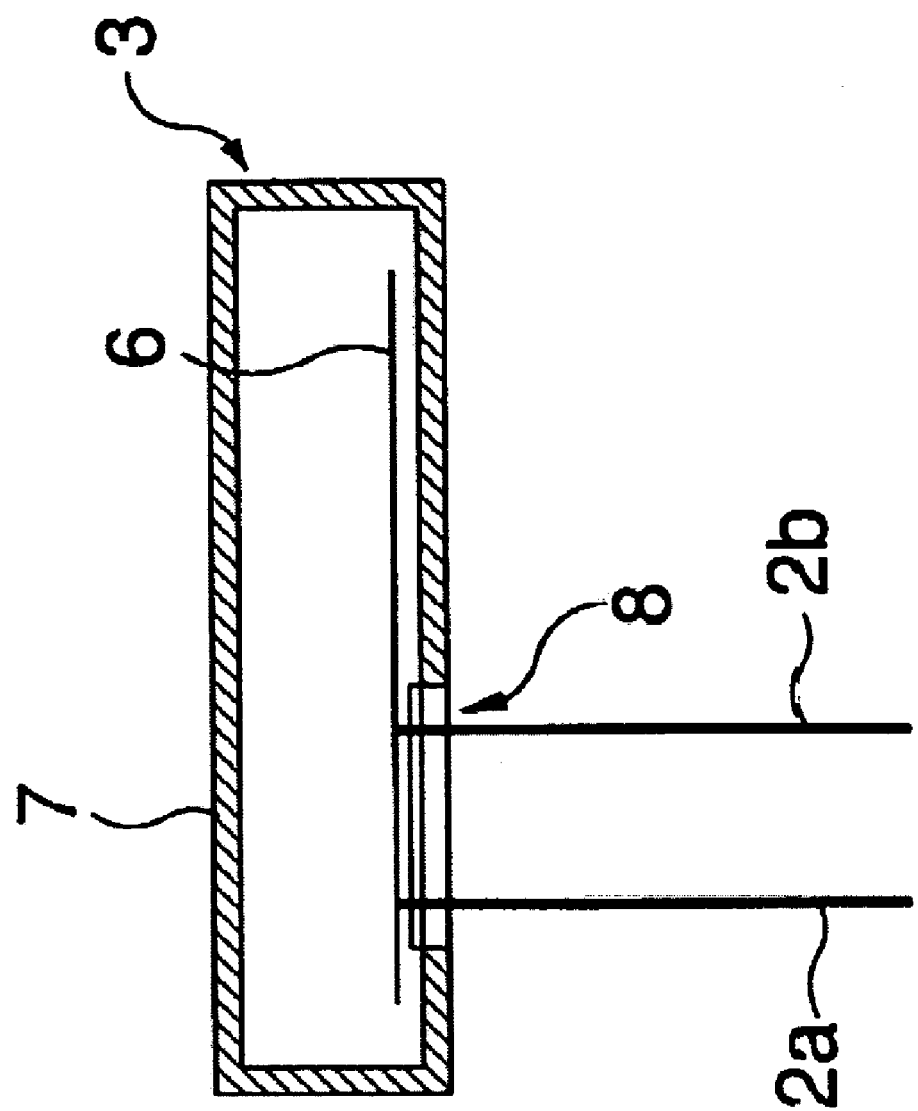
FIG. 4 shows a measuring unit according to an embodiment of the invention.
Figure 5:
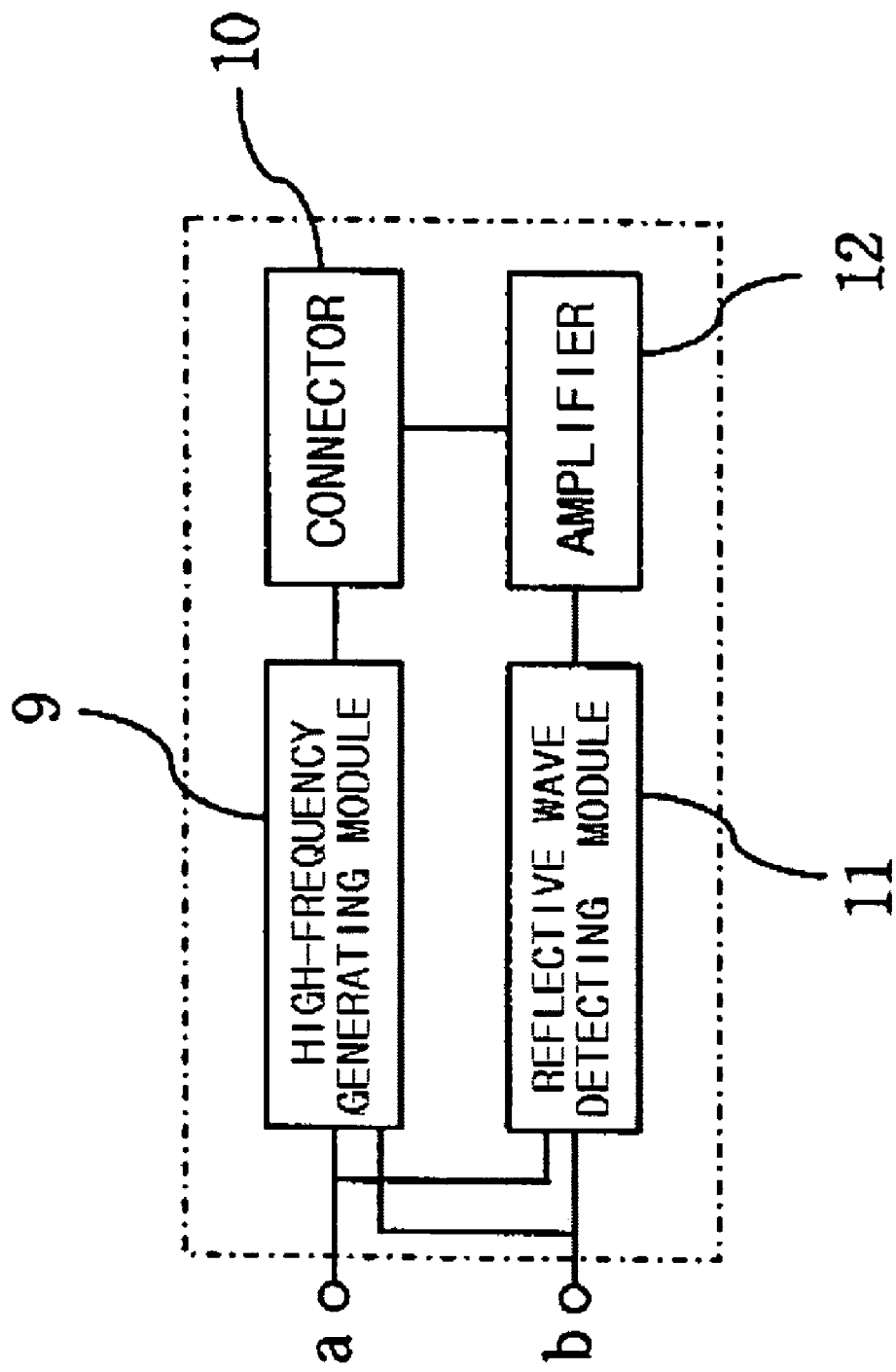
FIG. 5 shows a block diagram of the measuring unit of FIG. 4 according to an embodiment of the invention.

FIG. 4 shows a schematic drawing of measuring unit 3 and FIG. 5 shows a block diagram of measuring unit 3. As shown in FIG. 4, measuring unit 3 comprises a housing 7, a circuit substrate 6 and a sealing member 8. It is preferred that housing 7 is sealed with sealing material such as rubber so that fuel or contaminant does not enter the housing. Transmission lines 2a, 2b are connected to circuit substrate 6. Sealing member 8 prevents fuel and the like from entering measuring unit 3.

As shown in FIG. 5, the measuring circuit of measuring unit 3 comprises a high-frequency wave generating module 9, a connector 10, a reflective wave detecting module or a capacitor voltage detecting module 11 and an amplifier 12.

One transmission line 2a is connected to the high-frequency wave generating module 9 via input node "a" and the other transmission line 2b is connected to reflective wave detecting module 11 via input node "b."

The reflective wave or induced voltage measured by the reflective wave detecting module or capacitor voltage detecting module 11 is processed so as to indicate the amount of fuel in an instrument panel (not shown) of a vehicle.

It should be understood that rather than a pair of transmission lines, the reflective wave may be generated using other lines such as a strip, a coplanar waveguide, a coplanar strip, a coaxial cable and the like. However, a pair of transmission lines are most easily embodied, and therefore represent the presently contemplated best mode of the invention.

According to embodiments of the present invention, malfunctions and disorders due to mechanical defects are minimized since embodiments of the invention can be embodied electronically.

Further, the fuel amount can be measured very precisely since the measurement is made with the principle that the amplitude of the reflective wave or capacitance voltage varies depending upon the depth of fuel in a fuel tank.

In addition, the fuel gauge of the invention is safer than the conventional gauge since it can be completely sealed and since it does not require electric devices that may cause a fire or explosion in the fuel tank.

It should be understood that the invention has been described based on the preferred embodiments, which do not limit the scope of the present invention, but exemplify the invention. All of the features and the combinations thereof described in the preferred embodiments are not necessarily essential to the invention.

Although the present invention has been described by way of exemplary embodiments, it should be understood that those skilled in the art might make changes and substitutions without departing from the spirit and the scope of the present invention which is defined only by the appended claims.

What is claimed is:

1. An apparatus for measuring fuel amount contained in a fuel tank of a vehicle, comprising:

transmission lines provided within said fuel tank and being supplied with a high-frequency wave;

a measuring circuit for measuring an amplitude of a reflective wave of the high-frequency wave on said transmission lines, said amplitude being varied in accordance with an impedance of the transmission lines, wherein said impedance varies in accordance with a fuel amount contained in said fuel tank; and wherein a load resistor is provided at the ends of said transmission lines, said transmission lines being provided within a pipe member made of nonconductor, said pipe member having an open end and being provided with said fuel therein.

2. The apparatus of claim 1, wherein said transmission lines and said load resistor are sealed with a nonconductor.

3. The apparatus of claim 1, wherein said load resistor comprises a coplanar wave guide connected to said measuring circuit.

4. The apparatus of claim 2, wherein said transmission lines and said load resistor are adapted to perform reflective wave generation.

* * * * *